UNITED STATES PATENT OFFICE.

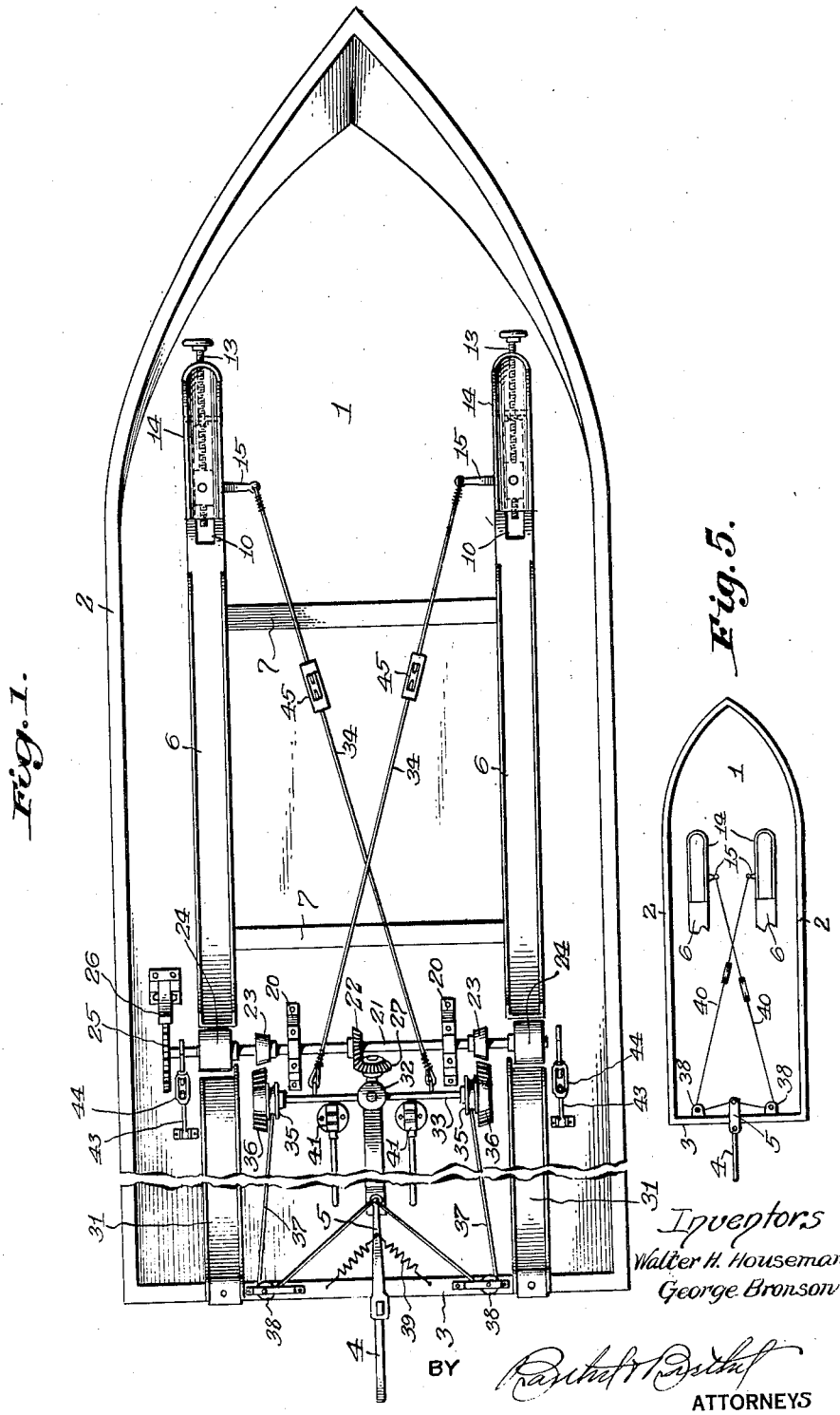

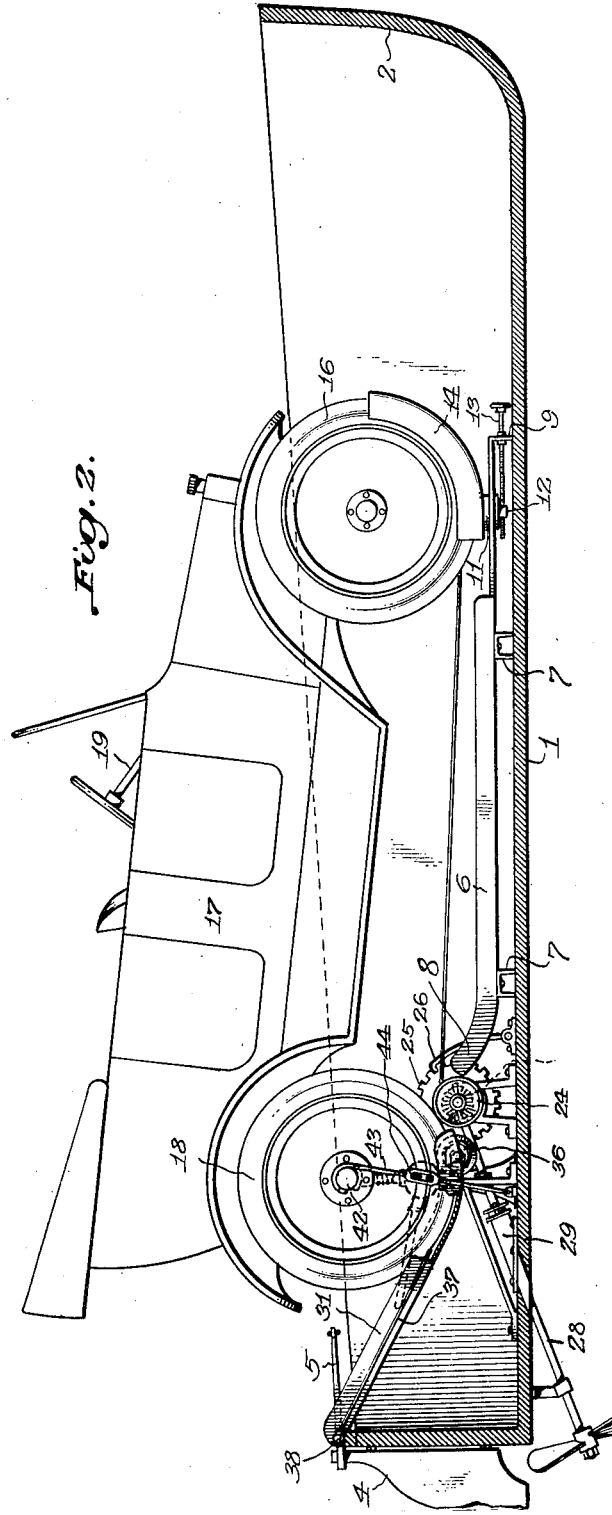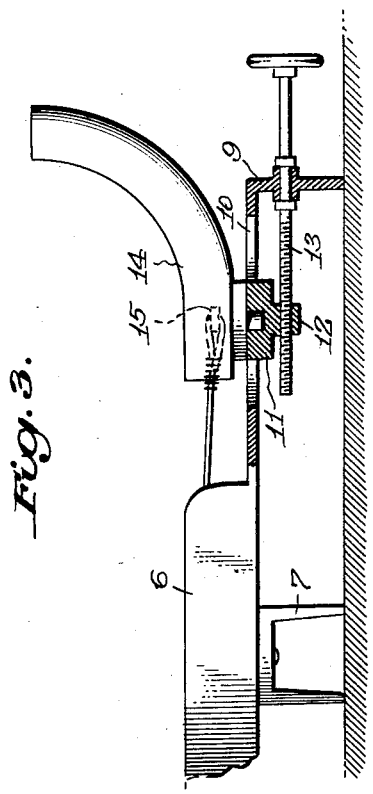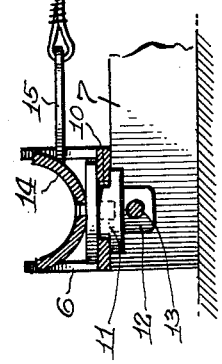

WALTER H. HOUSEMAN AND GEORGE BRONSON, OF HIGHLAND PARK, MICHIGAN.

AUTOMOBILE-BOAT.

1,380,319.  Specification of Letters Patent.  Patented May 31, 1921.

Application filed June 28, 1920. Serial No. 392,321.

*To all whom it may concern:*

Be it known that we, WALTER H. HOUSEMAN and GEORGE BRONSON, citizens of the United States of America, residing at Highland Park, in the county of Wayne and State of Michigan, have invented certain new and useful Improvements in Automobile-Boats, of which the following is a specification, reference being had therein to the accompanying drawings.

The primary object of our invention is to provide a novel boat into which an automobile or motor operated vehicle may be driven and the power plant of the automobile or vehicle utilized for operating the propeller of the boat, thus obviating the necessity of providing a separate power plant for the boat.

Another object of our invention is to combine an automobile and a boat in such manner that the steering mechanism of the automobile may be employed for actuating or controlling the steering mechanism of the boat, and it is in this connection that the operation of the boat may be completely controlled by the occupants of the automobile thus insuring comfort during the use of the boat.

A further object of our invention is to provide a boat with novel means for supporting an automobile therein, so that the power plant of the automobile may be employed for driving the boat and also steering the boat and provision is made so that automobiles or similar motor vehicles may be safely anchored in the boat and held against accidental displacement when a rough sea is encountered.

A still further object of our invention is to provide a boat in which an automobile may be placed and safely carried over a body of water. For instance, a ferry, and with an automobile owner in possession of one of our boats it is possible to enjoy the pleasure of water travel in the automobile as well as on land.

The above and other objects are attained by a novel combination and arrangement of parts that will be hereinafter specifically described and then claimed, and reference will now be had to the drawings, wherein—

Figure 1 is a plan of the boat, partly broken away;

Fig. 2 is a longitudinal sectional view of the boat showing an automobile in position for operating the boat;

Fig. 3 is an enlarged side elevation of a wheel shoe with its adjusting mechanism in longitudinal section;

Fig. 4 is a cross sectional view of the same, and

Fig. 5 is a diagrammatic plan illustrating a slight modification of our invention;

In the drawings, the reference numeral 1 denotes a boat hull having a suitable bow 2 and a transomed stern 3 which is provided with a suitable rudder 4 having a tiller 5.

In the hull 1 are longitudinal channel rails 6 supported on transverse members 7 and the rear ends of said rails are curved upwardly, as at 8, while the forward ends thereof have the side walls cut away to afford feet 9 which coöperate with the transverse members 7 in supporting the channel rails 6. The feet 9 are longitudinally slotted, as at 10, to receive slide heads 11 and said slide heads have nut portions 12 engaging screws 13 adjustable in the feet 9, so that the slide heads may be shifted longitudinally of the feet 9. Swiveled or pivotally connected to the slide heads 11 are the lower ends of segment shaped channel wheel members 14 provided with cranks or side arms 15. The wheel seat members 14 are adapted to receive and hold the front steering wheels 16 of an automobile 17, said automobile being of a conventional form having rear driven wheels 18 and a steering column assembly 19.

In the boat hull 1, adjacent the rear ends of the rails 6, are bearings 20 for a transverse shaft 21 provided with a beveled gear wheel 22, conical friction wheels 23, drive wheels 24, and a single ratchet wheel 25. The drive wheels 24 are in longitudinal alinement with the rails 6, the beveled gear wheel 22 intermediate the ends of the shaft 21, and the ratchet wheel 25 at one end of said shaft, said ratchet wheel being normally engaged by a pawl 26 suitably supported relative to the hull 1 and adapted to prevent a counterclockwise rotation of the shaft 21.

The beveled gear wheel 22 meshes with a beveled gear wheel 27 on the upper end of a propeller shaft 28 journaled in a bearing 29, carried by the boat hull 1. The propeller shaft 28 has a conventional form of propeller 30 by which the boat may be propelled when said propeller shaft is driven by the drive shaft 21. Suitably supported in longitudinal alinement with the rails 6 are channel inclined rails 31 extending from the upper edge of the transom stern 3 downwardly in proximity to the drive wheels 24 and it is on these inclined rails that the rear driven wheels 18 of the automobile rest when the automobile enters the boat. The automobile may enter the boat from a suitable wharf or dock and in some instances a special landing or skid may be provided so that the automobile may be driven on and off the boat.

Suitably mounted in the boat hull, adjacent the drive shaft 21, is a post 32 for a beam 33 and the ends of this beam are connected by cross rods 34 to the arms or cranks 15 of the wheel seat members 14, thus permitting the steering column assembly 19 being actuated to turn the front wheels 16, the wheel seat members 14, and through the medium of the cross rods 34, swing the beam 33 in a desired direction. On the ends of the beam 33 are sheaves 35 and conical friction wheels 36, the latter adapted for engagement with the conical friction wheels 23 of the shaft 21 when the beam 33 is shifted. Attached to and wound on the sheaves 35 are cables 37 trained about guide pulleys 38 on the transom stern 3 and attached to the end of the tiller 5. The sheaves 35 form part of the friction wheels 36 so that when one of said wheels has movement imparted thereto, one of the cables 37 will be wound on the driven sheave to pull on the tiller 5 and swing the rudder 4. The rudder is constantly maintained in a straight ahead position by coiled springs 39 connecting the tiller 5 to the transom stern 3, and the mechanism just described constitutes power operated means for adjusting the rudder 4 so that the boat may be steered.

As shown in Fig. 5, the wheel seat members 14 may be connected by cross cables 40 to the ends of the tiller 5, without depending on power of the automobile to operate the rudder. This modified form of construction is more simple and the movement of the rudder is at all times manually controlled from the steering column assembly of the automobile.

In the boat hull 1, are jacks or elevating devices 41 and after the automobile 17 has been placed in the boat with the rear axle 42 above the jacks 41, said jacks are operated to raise the rear wheels 18 off of the rails 31 and into contact with the drive wheels 24, as best shown in Fig. 2. To maintain the frictional contact between the rear driven wheels 18 and the drive wheels 24, the ends of the axle 42 are anchored relative to the jacks 41 and the boat hull by tie rods 43, which are carried by the boat hull and have hook shaped ends placed over the ends of the axle 42. Each tie rod has a turn buckle 44 or other tightening device so that the rear axle 42 can be drawn onto the jacks 41 and the drive wheels 24, thus firmly anchoring the rear end of the automobile with a driving relation between the driven wheels 18 and the drive wheels 24.

Should the automobile 17 have a long wheel base the wheel seat members 14 are adjusted accordingly, and the cross rods or cables 34 have turn buckles 45 or similar devices so that these connections may be lengthened or shortened to at all times retain a taut connection between the ends of the beam 33 and the wheel members 14, irrespective of the length of the automobile wheel base.

In operation, the occupants of the boat sit in the automobile just as though touring on land and the driver of the automobile places the engine in operation so that the rear wheels 18 will be driven. These wheels impart movement to the drive wheels 24 and through the medium of the shaft 21, beveled gear wheels 22 and 27, the propeller shaft 28 is driven. The speed of the boat is controlled by the driver of the automobile and the boat is steered by the driver, either through the power means or the connections shown in Fig. 5.

At the end of the journey it is only necessary to lower the rear axle 42, remove the tie rods 43 and then back the automobile off of the boat. The drive wheels 24 are held against counterclockwise rotation so that the wheels 18 will not spin against the same and also to permit of the front wheels 16 passing over the drive wheels from the rails 6 onto the inclined rails 31.

It is thought that the operation and utility of our invention will be apparent without further description, and while in the drawing, there is illustrated a preferred embodiment of our invention, it is to be understood that the structural elements are susceptible to such variations and modifications as fall within the scope of the appended claims.

What we claim is:—

1. The combination of a boat having a propeller, a shaft in said boat for driving the boat propeller, wheels on said shaft, an automobile supported in said boat with its rear wheels in driving relation to said shaft wheels, and steering means for the boat actuated from said shaft and controlled by the steering column assembly of the automobile.

2. The combination set forth in claim 1, wherein pivoted wheel seat members hold the front wheels of the automobile so that movement of said front wheels may be utilized for actuating said steering means.

3. The combination of a boat having a rudder, an automobile in said boat, means operated from said automobile for driving said boat, steering means for said boat operated from said means, and means operated from said automobile for controlling the steering of the boat.

4. The combination of a boat having a rudder and propeller, an automobile on said boat, a shaft in said boat driven from said automobile and adapted to operate said propeller, sheaves adapted to be driven from said shaft, cables actuated by said sheaves for moving said rudder, and means operatable from within said automobile for controlling the operation of said sheaves by said shaft.

5. The combination set forth in claim 4, wherein said means includes a pivoted beam supporting said sheaves and articulated with the front wheels of the automobile so that a steering movement of said front wheels actuates said beam to establish a driving relation between said shaft and either sheave.

In testimony whereof we affix our signatures in presence of two witnesses.

WALTER H. HOUSEMAN.
GEORGE BRONSON.

Witnesses:
KARL H. BUTLER,
ANNA M. DORR.